US008224778B1

(12) United States Patent
Makin (10) Patent No.: US 8,224,778 B1
(45) Date of Patent: Jul. 17, 2012

(54) SYSTEMS AND METHODS FOR BACKING UP EMAILS

(75) Inventor: Gaurav Makin, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 343 days.

(21) Appl. No.: 12/713,167

(22) Filed: Feb. 25, 2010

(51) Int. Cl.
 *G06F 17/30* (2006.01)
(52) U.S. Cl. ........................................ 707/640; 707/609
(58) Field of Classification Search ........................ None
 See application file for complete search history.

(56) References Cited

U.S. PATENT DOCUMENTS

2007/0143097 A1* 6/2007 Brunet et al. ................... 703/23
2011/0040730 A1* 2/2011 Belea ............................ 707/654

* cited by examiner

*Primary Examiner* — Cheryl Lewis
(74) *Attorney, Agent, or Firm* — Advantedge Law Group (57) ABSTRACT

A computer-implemented method for backing up emails may include: 1) identifying a file for storing emails, 2) inspecting the file to determine whether the file is in a consistent state, 3) determining that the file is in a consistent state, and then 4) performing a backup operation on the file. Various other methods, systems, and computer-readable media are also disclosed.

14 Claims, 7 Drawing Sheets

SYSTEMS AND METHODS FOR BACKING UP EMAILS

BACKGROUND

Consumers and enterprises increasingly rely on electronic messages, such as emails, to accomplish tasks and/or to conduct day-to-day business operations. Because electronic messages often include important text and documents, organizations may regularly back up such messages in an attempt to prevent data loss.

Unfortunately, conventional backup methods may not be effective for some email clients. For example, an email archive file (such as a PST file created by MICROSOFT OUTLOOK) may remain locked while an email client is open, preventing conventional backup methods from freely accessing the email archive file. Backup software may circumvent this problem by taking a snapshot of the entire email volume and performing backup operations on the snapshot. This approach, however, may present problems for backing up emails for some email clients, such as MICROSOFT OUTLOOK. As there is no VSS writer for a PST file to ensure the consistency of the PST file, the backup software may take the snapshot when the email archive file is in an inconsistent state, resulting in an incomplete or corrupted backup of the email archive file.

SUMMARY

As will be described in greater detail below, the instant disclosure generally relates to systems and methods for backing up emails by ensuring that a file for storing emails is in a consistent internal state before and/or after backing up the file. In one example, one or more of the various systems described herein may accomplish this task by: 1) identifying a file for storing emails, 2) inspecting the file to determine whether the file is in a consistent state, 3) determining that the file is in a consistent state, and then 4) performing a backup operation on the file.

Inspecting the file to determine whether the file is in a consistent state may include checking a flag in the file that indicates whether the file is in a consistent state. In some examples, inspecting the file to determine whether the file is in a consistent state may include: 1) determining that the file is in an inconsistent state and 2) monitoring changes to the file until the file is in a consistent state. If a snapshot of the file has been taken, inspecting the file may entail inspecting a snapshot of the file to determine whether the file is in a consistent state in the snapshot.

In some examples, performing the backup operation on the file may include taking a snapshot of the file. Additionally or alternatively, performing the backup operation on the file may include backing up the snapshot of the file.

The various systems described herein may handle changes and/or attempted changes to the file in a variety of ways. Some examples may include intercepting attempts to write to the file after determining that the file is in a consistent state. These examples may additionally include forwarding the attempts to write to the file after the backup operation. In some examples, forwarding the attempts may entail forwarding the attempts in the order in which the attempts were made.

Some examples may include identifying changes made to the file after determining that the file is in a consistent state. Some additional examples may include reversing the changes made to the file.

As will be explained below, by ensuring that a file for storing emails is in a consistent state before performing a backup operation on the file, the systems and methods described herein may ensure that a backup of the file for storing emails is consistent and accurate, and that a subsequent restoration of the backup may yield a usable file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for backing up emails. In one example, the various systems described herein may accomplish this task by: 1) identifying a file for storing emails, 2) inspecting the file to determine whether the file is in a consistent state, 3) determining that the file is in a consistent state, and then 4) performing a backup operation on the file.

The following will provide, with reference to FIGS. 1-2 and 4-5, detailed descriptions of exemplary systems for backing up emails. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
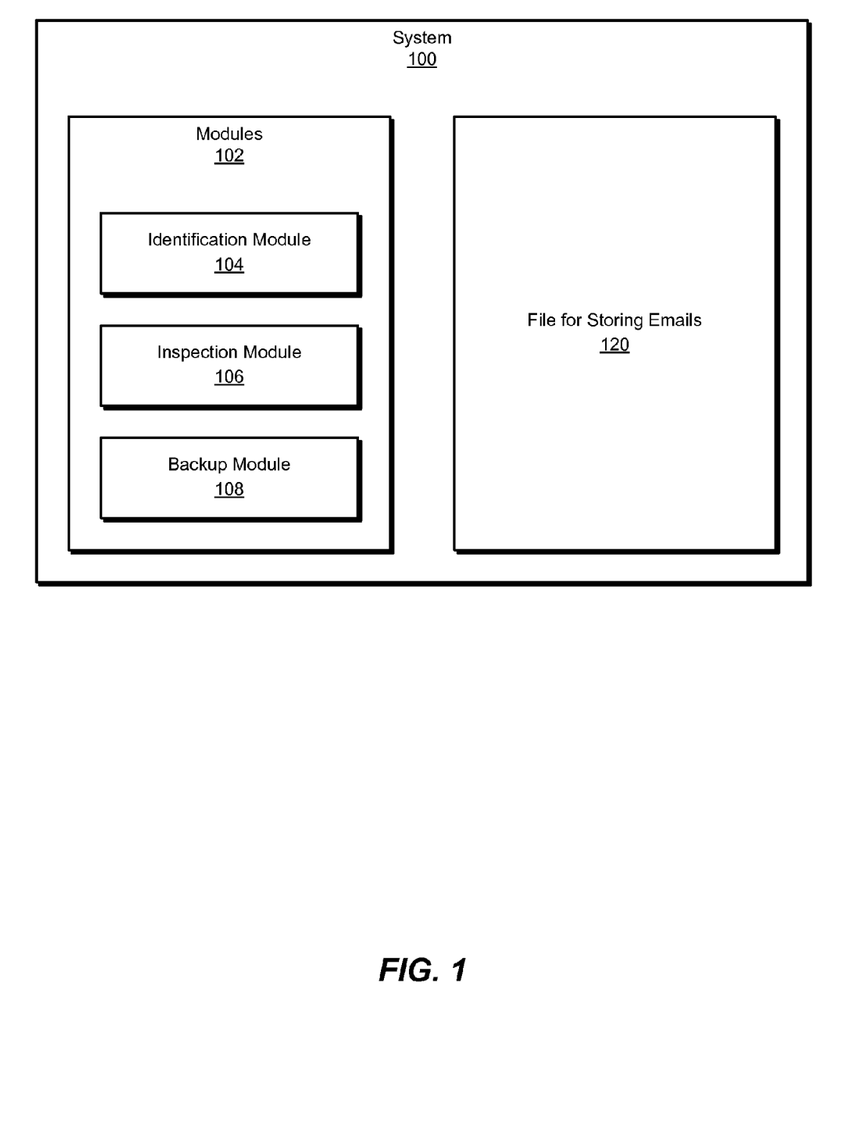
FIG. 1 is a block diagram of an exemplary system for backing up emails.

FIG. 1 is a block diagram of an exemplary system 100 for backing up emails. As illustrated in this figure, exemplary system 100 may include one or more modules 102 for performing one or more tasks. For example, and as will be explained in greater detail below, exemplary system 100 may include an identification module 104 programmed to identify a file for storing emails. Exemplary system 100 may also include an inspection module 106 programmed to: 1) inspect the file to determine whether the file is in a consistent state and 2) determine that the file is in a consistent state.

In addition, and as will be described in greater detail below, exemplary system 100 may include a backup module 108 programmed to perform a backup operation on the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such computing system 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a file for storing emails 120. File 120 may represent portions of a single file or computing device or a plurality of files or computing devices. For example, file 120 may represent a portion of computing system 202 in FIG. 2, computing system 610 in FIG. 6, and/or portions of exemplary network architecture 700 in FIG. 7. File 120 may include any database, data set, archive, and/or file used for storing, containing, and/or organizing emails.

Figure 2:
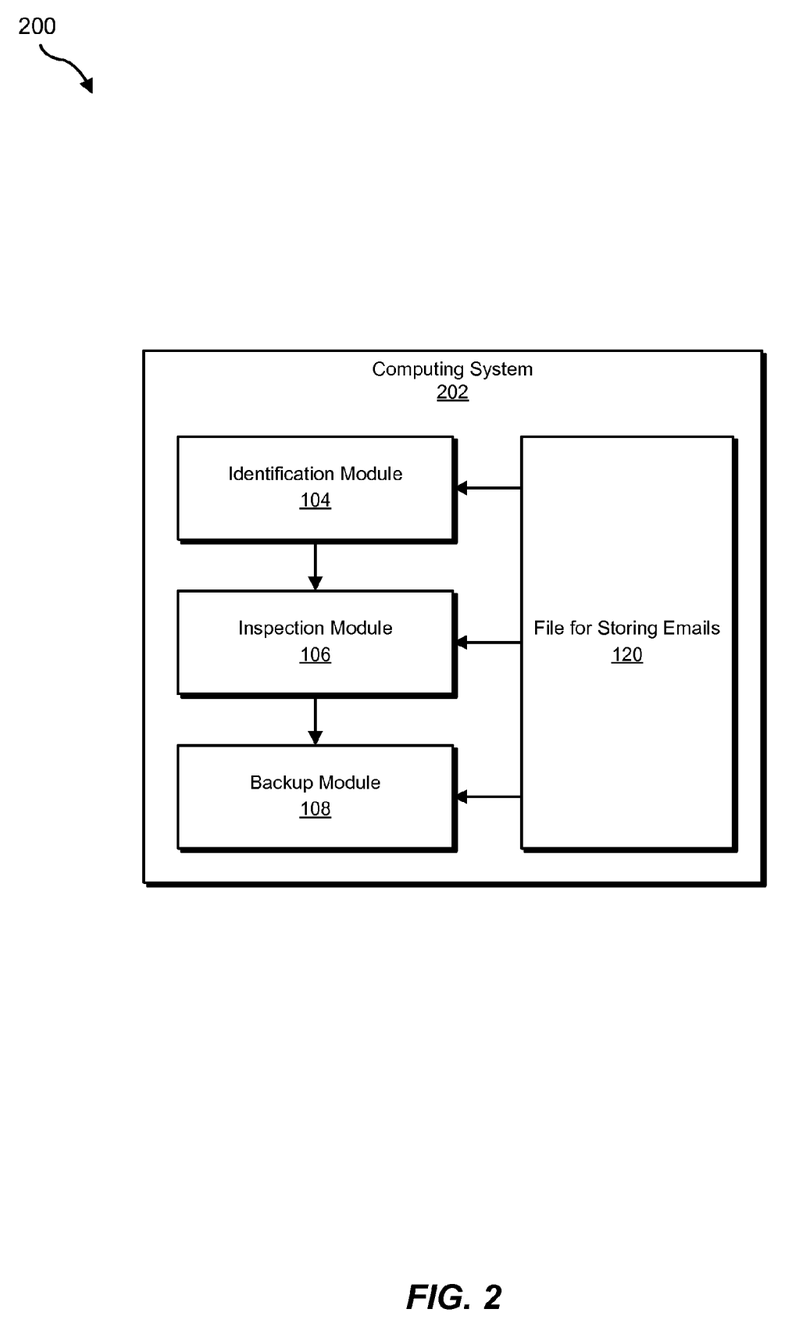
FIG. 2 is a block diagram of an exemplary system for backing up emails.

Exemplary system 100 in FIG. 1 may be deployed in a variety of ways. For example, all or a portion of exemplary system 100 may represent portions of an exemplary system 200 illustrated in FIG. 2. As shown in FIG. 2, system 200 may include a computing system 202 in communication with a server 206 via a network 204. In one embodiment, and as will be described in greater detail below, modules 102 from FIG. 1 may cause computing system 202 to 1) identify a file for storing emails (such as file 120), 2) inspect the file to determine whether the file is in a consistent state (by, e.g., checking a flag in file 120), 3) determine that the file is in a consistent state, and then 4) perform a backup operation on the file.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Figure 3:
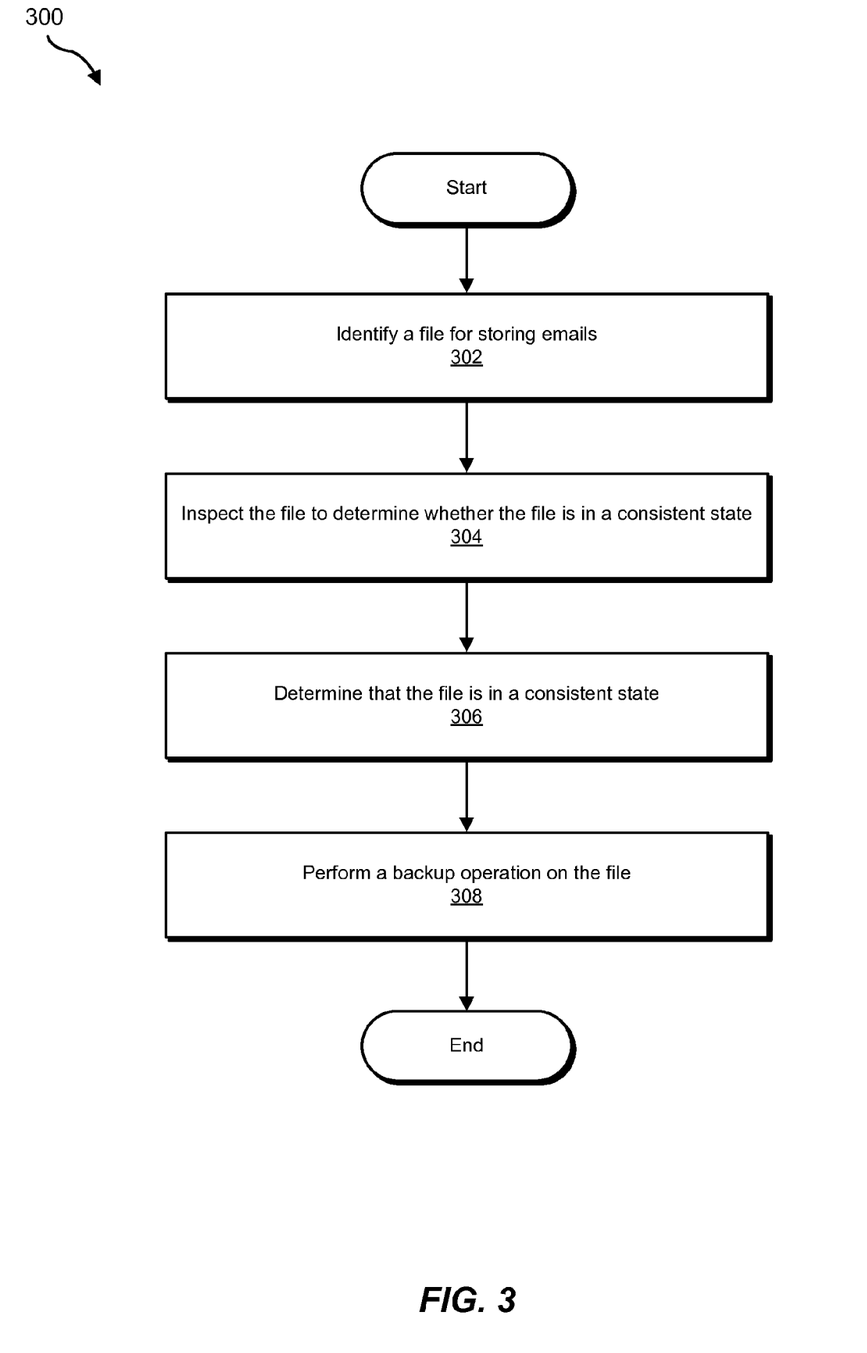
FIG. 3 is a flow diagram of an exemplary method for backing up emails.

FIG. 3 is a flow diagram of an exemplary computer-implemented method 300 for backing up emails. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a file for storing emails. For example, at step 302 identification module 104 may, as part of computing system 202 in FIG. 2, identify file 120. As used herein, the term "file for storing emails" may refer to any file that may have an internally inconsistent state at some points in time. For example, a "file for storing emails" may include a PST file for MICROSOFT OUTLOOK.

Identification module 104 may identify a file for storing emails in any suitable manner. For example, identification module 104 may read a configuration file that identifies a file for storing emails. Additionally or alternatively, identification module 104 may receive a message (e.g., from a backup system) identifying a file for storing emails. In some examples, identification module 104 may identify a file for storing emails by: 1) analyzing files to be backed up and then 2) determining that one of the files may require specialized treatment (e.g., identification module 104 may determine that a file is a PST file, and may therefore require certain procedures to ensure a consistent backup).

At step 304, one or more of the systems described herein may inspect the file to determine whether the file is in a consistent state. For example, at step 304 inspection module 106 may, as part of computing system 202 in FIG. 2, inspect file 120 to determine whether file 120 is in a consistent state. As used herein, the term "consistent state," as applied to a file, may refer to a file that is compliant with an expected atomicity, that includes no relevant incomplete transactions, and/or that is in a state suitable for backing up and/or restoring.

Inspection module 106 may inspect the file to determine whether the file is in a consistent state in a number of ways. For example, inspection module 106 may attempt to parse the file according to the expected format of the file. Additionally or alternatively, inspection module 106 may attempt to load the file (e.g., to see whether attempting to load the file results in an error).

In some examples, inspection module 106 may check a flag in the file that indicates whether the file is in a consistent state. As used herein, the term "flag" may refer to any flag, marker, and/or indicator. For example, if the file is a PST file for MICROSOFT OUTLOOK, inspection module 106 may check the fAMapValid flag in the header of the file. At the beginning of a transaction that will either allocate or free space in the PST file, MICROSOFT OUTLOOK may set the fAMapValid flag to INVALID_AMAP to indicate that a transaction has started. After completing the operation, MICROSOFT OUTLOOK may set the fAMapValid flag to VALID_AMAP to indicate that the transaction has completed. Accordingly, by checking the fAMapValid flag in a PST file, inspection module 106 may determine whether the file is in a consistent state.

Before performing a backup operation, in some examples, inspection module 106 may inspect the file over a period of time. For example, inspection module 106 may initially determine that the file is in an inconsistent state (e.g., by checking a flag in the file). After determining that the file is in an inconsistent state, inspection module 106 may monitor changes to the file until the file is in a consistent state. For example, inspection module 106 may include a portion of a filter driver. Inspection module 106 may accordingly monitor writes to the file. In some examples, inspection module 106 may monitor for writes to the file at an offset in the file where a flag is maintained (e.g., the fAMapValid flag mentioned above). Inspection module 106 may accordingly determine when the flag is changed. By monitoring the file while the file is in an inconsistent state until the file is in a consistent state, inspection module 106 may continuously inspect the file to determine whether the file is in a consistent state.

In some contexts, a backup system and/or one or more of the systems described herein may have already taken a snapshot of the file (e.g., in preparation for backing up the file). In these contexts, inspection module 106 may inspect the file by inspecting a snapshot of the file to determine whether the file is in a consistent state in the snapshot. Inspection module 106 may apply any of the techniques discussed earlier to determine whether the file is in a consistent state within the snapshot. As will be described below, a backup module may subsequently back up the snapshot of the file if the file is in a consistent state in the snapshot.

At step 306, one or more of the systems described herein may determine that the file is in a consistent state. For example, at step 306 inspection module 106 may, as part of computing system 202 in FIG. 2, determine that file 120 is in a consistent state.

Inspection module 106 may perform step 306 in any suitable manner. For example, if the file is a PST file, inspection module 106 may determine that the fAMapValid flag is set to VALID_AMAP. Additionally or alternatively, as mentioned above, inspection module 106 may have monitored changes to the file until the file came to a consistent state. Accordingly, inspection module 106 may determine that the file is in a consistent state by observing a change to the file that brings the file to a consistent state.

At step 308, one or more of the systems described herein may perform a backup operation on the file. For example, at step 308 backup module 108 may, as part of computing system 202 in FIG. 2, back up file 120.

Backup module 108 may perform the backup operation in a variety of contexts. For example, as mentioned above, a backup system and/or one or more systems described herein may have taken a snapshot of the file. Once inspection module 106 determines that the file is in a consistent state within the snapshot, backup module 108 may perform a backup operation by backing up the snapshot of the file. Additionally or alternatively, once inspection module 106 determines that the file is in a consistent state, backup module 108 make take a snapshot of the file (e.g., for subsequent backup).

As described in the examples given above, embodiments of the instant disclosure may use a variety of approaches for achieving a backup of the file in a consistent state. For example, embodiments of the instant disclosure may take a snapshot and then verify that the file in the snapshot is in a consistent state (e.g., taking snapshot until a snapshot is in a consistent state). Additionally or alternatively, embodiments of the instant disclosure may determine that the file is in a consistent state and then take a snapshot of the file. After completing step 308, the method illustrated in FIG. 3 may terminate.

Figure 4:
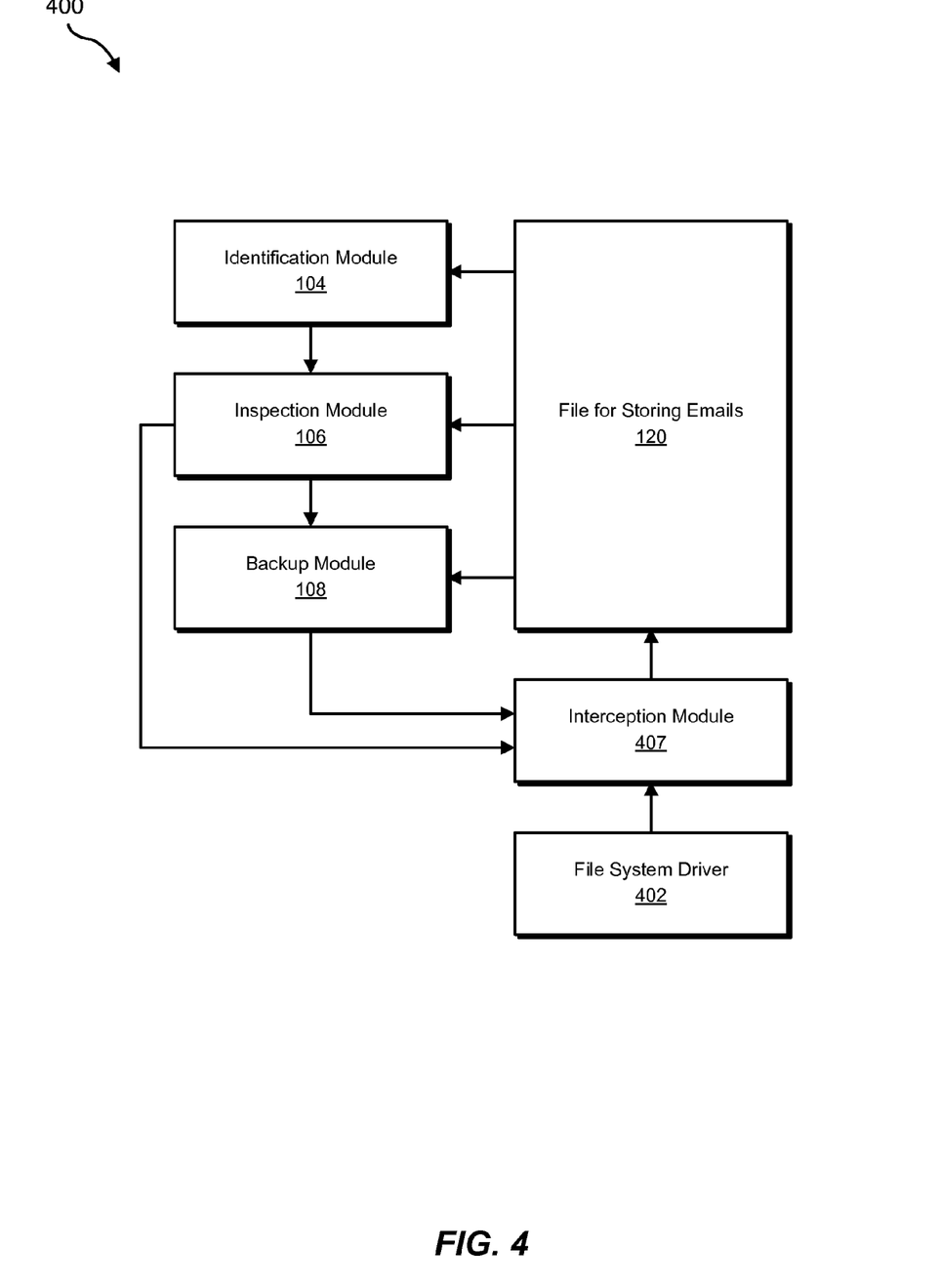
FIG. 4 is a block diagram of an exemplary system for backing up emails.

In some embodiments, one or more of the systems and methods described herein may also maintain the consistency of a file for storing emails (e.g., after determining that the file is in a consistent state and before the file is backed up). For example, FIG. 4 illustrates an exemplary system 400 with an interception module 407. Interception module 407 may be programmed to intercept attempts to write to a file for storing emails (e.g., file 120) after determining that the file is in a consistent state.

Interception module 407 may intercept the attempts to write to the file in any suitable manner. As illustrated in FIG. 4, interception module 407 may intercept the attempts to write to the file from a file system driver, such as file system driver 402. For example, interception module 407 may include a portion of a filter driver through which write request packets for the file may pass. Interception module 407 may cache the write request packets destined for the file. Additionally or alternatively, interception module 407 may instruct a filter driver to cache the write request packets. In some embodiments, interception module 407 may begin to intercept attempts to write to the file directly after determining that the file is in a consistent state and before starting a snapshot of the file.

Once the backup operation is complete (e.g., a snapshot of the file is taken), interception module 407 may forward the attempts to write to the file. For example, interception module 407 may unblock pending write request packets (e.g., as a part of the filter driver and/or by instructing the filter driver to unblock the pending write request packets for the file). In some examples, interception module 407 may forward the attempts in the order in which the attempts were made. For example, interception module 407 may cache the write request packets in a first-in-first-out data structure such as a queue, and unblock the write request packets in accordance with the data structure. Additionally or alternatively, interception module 407 may inspect time stamps associated with the write request packets and unblock the write request packets in the order of the time stamps.

Figure 5:
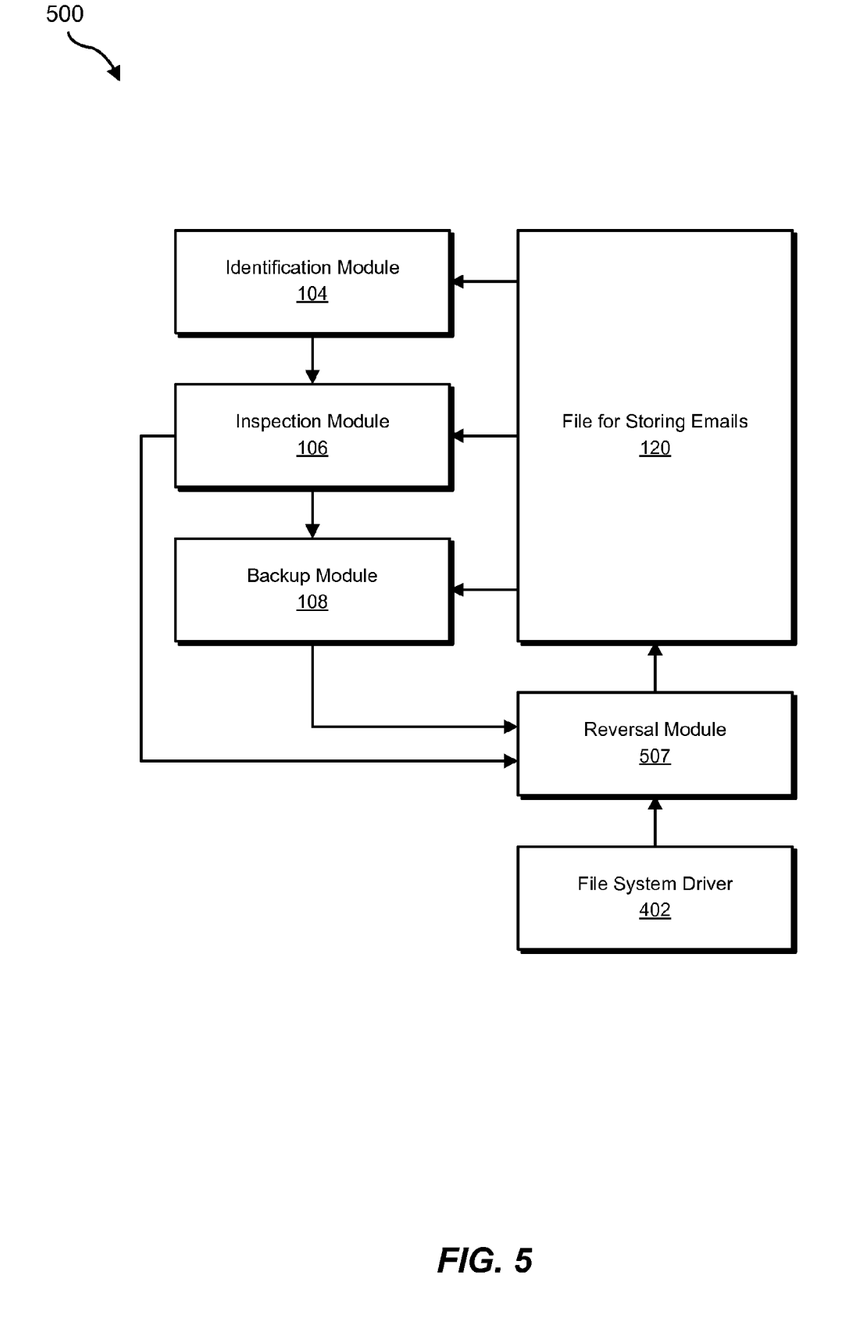
FIG. 5 is a block diagram of an exemplary system for backing up emails.

In another example, one or more of the systems and methods described herein may maintain the consistency of a file for storing emails by identifying changes made to the file after determining that the file is in a consistent state. For example, FIG. 5 illustrates an exemplary system 500 with a reversal module 507. In this example, reversal module 507 may be programmed to identify changes made to a file for storing emails (e.g., file 120) after determining that the file is in a consistent state.

Reversal module 507 may identify changes made to the file in any suitable manner. As illustrated in FIG. 5, reversal module 407 may intercept attempts to change the file from a file system driver, such as file system driver 402. For example, reversal module 507 may include a portion of a filter driver through which write request packets for the file may pass. In this example, reversal module 507 may identify the write request packets destined for the file. Additionally or alternatively, reversal module 507 may instruct a filter driver to identify the write request packets. Reversal module 507 may then copy parts of the file that are to be overwritten before the parts are overwritten.

Once the backup operation is complete, reversal module 507 may reverse the changes made to the file in the backup copy of the file. For example, reversal module 507 may identify what parts of the file were overwritten after the file was determined to be in a consistent state and rewrite those parts of the backup copy of the file with the original data.

As detailed above, by ensuring that a file for storing emails is in a consistent state before performing a backup operation on the file, the systems and methods described herein may ensure that a backup of the file for storing emails is consistent and accurate, and that a subsequent restoration of the backup may yield a usable file. The systems and methods described herein may also accomplish the same by ensuring that the file remains in a consistent state during a backup operation (e.g., while a snapshot of the file is being taken).

The various systems described herein may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 6:
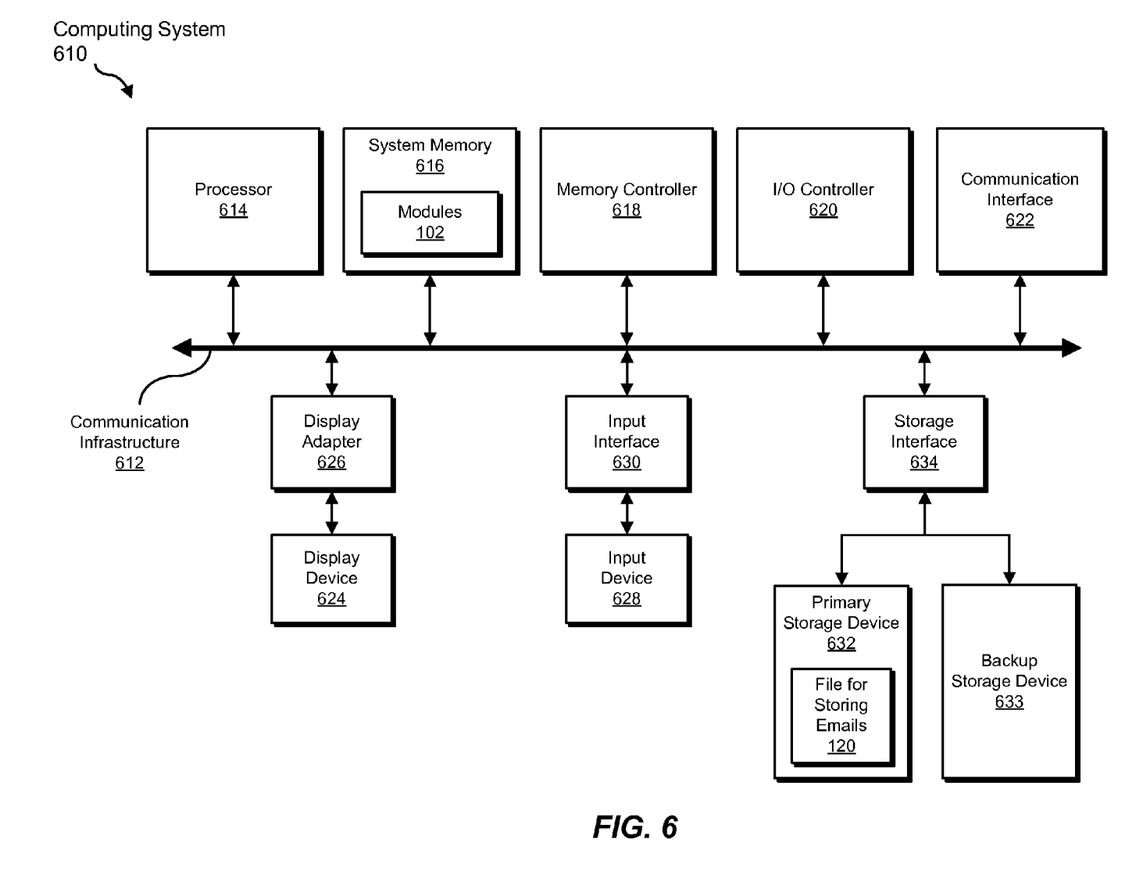
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, inspecting, checking, determining, monitoring, taking, backing up, intercepting, forwarding, and/or reversing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, inspecting, checking, determining, monitoring, taking, backing up, intercepting, forwarding, and/or reversing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, inspecting, checking, determining, monitoring, taking, backing up, intercepting, forwarding, and/or reversing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, inspecting, checking, determining, monitoring, taking, backing up, intercepting, forwarding, and/or reversing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, inspecting, checking, determining, monitoring, taking, backing up, intercepting, forwarding, and/or reversing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, file 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, inspecting, checking, determining, monitoring, taking, backing up, intercepting, forwarding, and/or reversing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
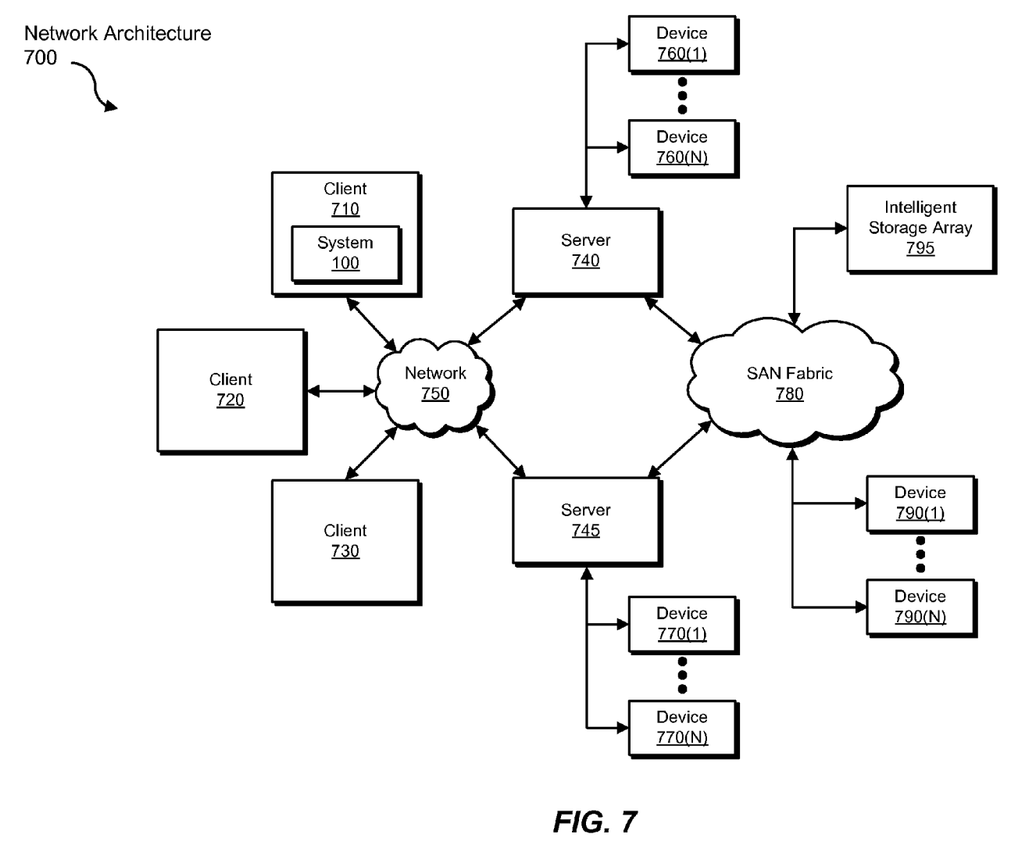
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, inspecting, checking, determining, monitoring, taking, backing up, intercepting, forwarding, and/or reversing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for backing up emails.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a file for storing emails into a consistent backup of a file for storing emails. In another example, one or more of the modules described herein may transform a computing system into a system for performing a consistent backup of a file for storing emails.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for backing up emails, at least a portion of the method being performed by a computing device comprising at least one processor, the method comprising:
   identifying a file for storing emails;
   inspecting the file to determine whether the file is in a consistent state;
   determining that the file is in a consistent state;
   intercepting attempts to write to the file after determining that the file is in a consistent state;
   performing a backup operation on the file;
   forwarding the attempts to write to the file after the backup operation;
   wherein performing the backup operation on the file comprises taking a snapshot of the file.

2. The computer-implemented method of claim 1, wherein inspecting the file to determine whether the file is in a consistent state comprises checking a flag in the file that indicates whether the file is in a consistent state.

3. The computer-implemented method of claim 1, wherein forwarding the attempts to write to the file comprises forwarding the attempts in the order in which the attempts were made.

4. The computer-implemented method of claim 1, further comprising identifying changes made to the file after determining that the file is in a consistent state.

5. The computer-implemented method of claim 4, further comprising reversing the changes made to the file.

6. The computer-implemented method of claim 1, wherein inspecting the file to determine whether the file is in a consistent state comprises:
   determining that the file is in an inconsistent state;
   monitoring changes to the file until the file is in a consistent state.

7. The computer-implemented method of claim 1, wherein inspecting the file to determine whether the file is in a consistent state comprises inspecting the snapshot of the file to determine whether the file is in a consistent state in the snapshot.

8. The computer-implemented method of claim 7, wherein performing the backup operation on the file further comprises backing up the snapshot of the file.

9. A system for backing up emails, the system comprising:
   an identification module programmed to identify a file for storing emails;
   an inspection module programmed to:
      inspect the file to determine whether the file is in a consistent state;
      determine that the file is in a consistent state;
   an interception module programmed to intercept attempts to write to the file after determining that the file is in a consistent state;
   a backup module programmed to perform a backup operation on the file;
   at least one processor configured to execute the identification module, the inspection module, the interception module, and the backup module;
   wherein the interception module is further programmed to forward the attempts to write to the file after the backup operation and the backup operation comprises taking a snapshot of the file.

10. The system of claim 9, wherein the inspection module is programmed to inspect the file to determine whether the file is in a consistent state by checking a flag in the file that indicates whether the file is in a consistent state.

11. The system of claim 9, wherein the interception module is programmed to forward the attempts to write to the file by forwarding the attempts in the order in which the attempts were made.

12. The system of claim 9, further comprising a reversal module programmed to identify changes made to the file after determining that the file is in a consistent state.

13. The system of claim 12, wherein the reversal module is further programmed to reverse the changes made to the file.

14. A non-transitory computer-readable-storage medium comprising one or more computer-executable instructions that, when executed by at least one processor of a computing device, cause the computing device to:
   identify a file for storing emails;
   inspect the file to determine whether the file is in a consistent state;
   intercept attempts to write to the file after determining that the file is in a consistent state;
   determine that the file is in a consistent state;
   perform a backup operation on the file;
   forward the attempts to write to the file after the backup operation;
   wherein performing the backup operation on the file comprises taking a snapshot of the file.

* * * * *